United States Patent [19]
Lallement et al.

[11] 4,134,416
[45] Jan. 16, 1979

[54] SAFETY DEVICE FOR CLOSING A PIPELINE, ESPECIALLY FOR THE GASOLINE TANK OF AUTOMOTIVE VEHICLES

[75] Inventors: Serge Lallement, La Chapelle sur Erdre; Philippe Martineau, Nantes, both of France

[73] Assignee: Regie Nationale des Usines Renault, Boulogne-Billancourt, France

[21] Appl. No.: 786,868

[22] Filed: Apr. 12, 1977

[30] Foreign Application Priority Data

Apr. 13, 1976 [FR] France ................................ 76 10778

[51] Int. Cl.$^2$ ............................................. F16K 3/26
[52] U.S. Cl. ..................................... 137/38; 137/590; 137/797; 251/353
[58] Field of Search ................. 137/38, 577, 590, 797; 251/144, 349, 353; 285/4; 280/5, 5 A; 180/103 A, 103 BF

[56] References Cited

U.S. PATENT DOCUMENTS

| | | | |
|---|---|---|---|
| 1,393,864 | 10/1921 | Weitz | 251/353 X |
| 2,048,388 | 7/1936 | Johnson | 285/4 X |
| 2,841,314 | 7/1958 | Monson et al. | 251/353 X |
| 3,173,469 | 3/1965 | Sleockey | 137/590 |
| 3,372,844 | 3/1968 | Kitabayashi | 251/353 X |

*Primary Examiner*—William R. Cline
*Attorney, Agent, or Firm*—Oblon, Fisher, Spivak, McClelland & Maier

[57] ABSTRACT

A safety device for blocking a fuel line leading from an automobile gas tank having an outer elongate sleeve passing through the wall of the gas tank and having a lateral hole therein opening into the gas tank, and a tubular assembly slidable within the sleeve. The tubular assembly features a lateral opening which, at a given position of the assembly within the sleeve, opens through the lateral opening in the sleeve into the gas tank. The tubular assembly has a stop at one end limiting its movement toward the outside of the gas tank by engagement with the sleeve and has a peripheral constriction at one point for breaking during a violent collision, whereby the openings in the sleeve and the tubular assembly are not aligned and fuel cannot escape from the gas tank during such collisions.

4 Claims, 6 Drawing Figures

SAFETY DEVICE FOR CLOSING A PIPELINE, ESPECIALLY FOR THE GASOLINE TANK OF AUTOMOTIVE VEHICLES

BACKGROUND OF THE INVENTION

1. Field of the Invention

The present invention concerns a safety device for blocking, in case of a collision, the fuel line leading from the gas tank to the motor of an automobile, and particularly in the case of a pliable gas tank consisting of two elastomer shells fused together at their edges.

2. Description of the Prior Art

The problem of containing the fuel of an automobile at the time of an accident has given rise to a number of partial solutions having to do with the gas cap, the nature of the tank itself, its placement in the vehicle, and the like. However there remains a great risk in case the fuel line breaks away, under certain conditions, from the gas tank. The latter is attached to the vehicle chassis at a location different from that holding the fuel line and deformations of the chassis produce stresses at the junction with the gas tank which may tend to pull the line away or drive it into the tank, thus allowing fuel to escape and burn.

SUMMARY OF THE INVENTION

The object of the present invention is to provide a safety device for blocking the fuel line leading from the gas tank to the motor of an automobile and thereby to remedy the above defects and to prevent the escape of fuel.

BRIEF DESCRIPTION OF THE DRAWINGS

Various other objects, features and attendant advantages of the present invention will be more fully appreciated as the same becomes better understood from the following detailed description, when considered in connection with the accompanying drawings, wherein like reference numerals designate like or corresponding parts throughout the several views, and in which.

DETAILED DESCRIPTION OF THE ILLUSTRATED EMBODIMENTS

Figure 1:
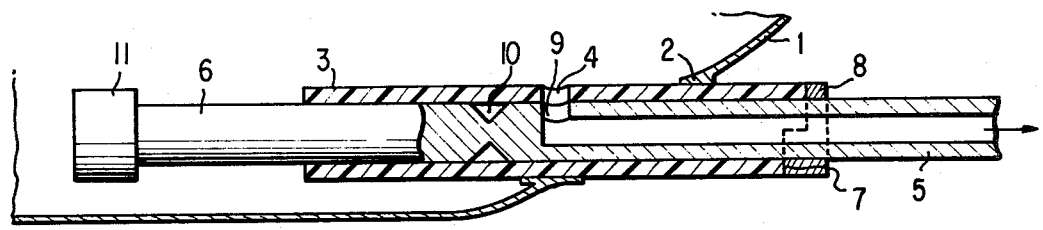
FIGS. 1 to 3 illustrate three stages in the effect of a collision on the device of the present invention, seen in longitudinal cross section.
Figure 2:
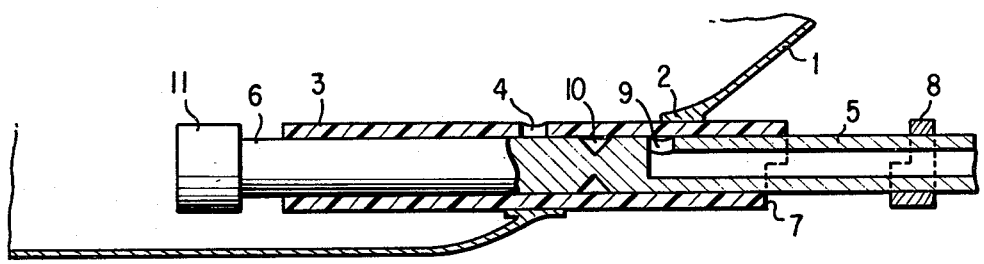
Figure 3:
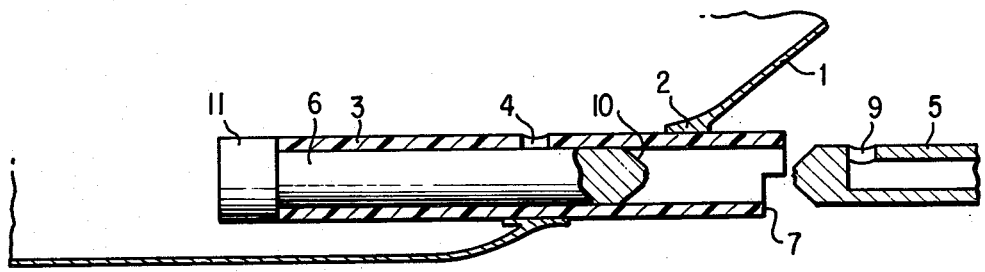

Referring now to the embodiment illustrated in FIGS. 1 to 3, the gas tank is partially represented by a wall 1 which is pierced and reinforced at a point 2 wherethrough the fuel line to the motor passes. The wall 1 may consist, but not necessarily, of a sheet of elastomer in the case of a pliable gas tank, being deformable without breaking in case of a violent collision.

The safety device of the present invention consists essentially of an outer elongate sleeve 3 of relatively rigid synthetic material which extends into the gas tank and is fastened thereto in a gastight manner at the reinforced location 2. The sleeve 3 has a lateral circular hole 4 in the wall thereof and serves to guide longitudinally an inner hollow tube 5 having a solid cylindrical extension 6 at one end which is terminated by an enlarged stop 11 disposed outside one end of the sleeve 3, the junction between the solid cylindrical extension 6 and the hollow tube 5 having a peripheral constriction 10. At the right of the constriction 10, as seen in the Figures, the central hollow portion of the inner tube 5 ends in a lateral opening 9, permitting it to communicate with the interior of the gas tank through the hole 4 in the outer sleeve 3. As can be seen in FIGS. 2 and 3, the outer sleeve 3 has at its outer end a recess 7, the end of the sleeve 3 being cut back around the lower half of its circumference to provide recess 7 with an L-shaped configuration in cross-section.

In complementary fashion, the inner tube 5 supports about its periphery a collar 8 held thereon by relatively high friction, the lower half, as shown in the drawings, of the collar's circumference having an increased longitudinal thickness equivalent to the cut-back portion of recess 7. By this configuration, during insertion of the inner tube 5 into the sleeve 3, the holes 4 and 9 will coincide when the complementary parts, namely collar 8 and recess 7 mate, as shown in FIG. 7.

When the vehicle experiences a violent collision, deforming the chassis, the central tube 5 may be driven into or pulled out of the gas tank. In the first case, the collar 8 mounted thereon and resting against the outer end of the sleeve 3 is restrained from movement, but allows the tube 5 to slide therewithin and to move to the left. When this happens, communication between the hollow part of the tube 5 and the hole 4 in the sleeve 3 is interrupted, thus preventing the fuel from running out of the gas tank.

In the second case, when the inner tube 5 is pulled out of the sleeve 3, the solid part 6 moves toward the right of the figure until the stop 11 hits the end of the sleeve inside the gas tank 1. In this position, again, the holes 4 and 9 do not coincide, as shown in FIG. 3, and the flow of fuel is interrupted.

In the case of a violent collision, the hollow tube 5 separates from the solid part 6 by rupturing the constriction 10, thus avoiding too great a stress on the safety device while maintaining interruption of fuel flow from the gas tank.

The materials of which the elements 3 and 5, which move relative to one another, are made, as well as the dimensions and surface conditions of the elements, are experimentally adapted to produce the friction desired for this application.

Figure 4:
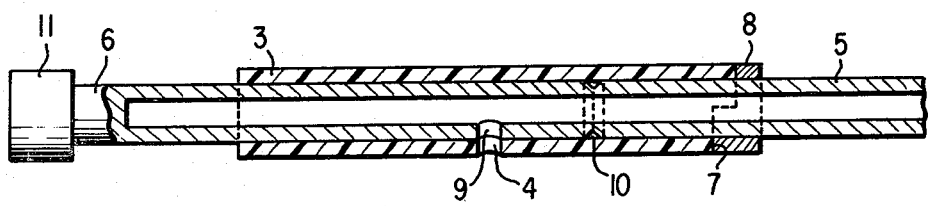
FIG. 4 is a longitudinal cross section view of another embodiment of the present invention.

In the modification of FIG. 4, it is intended to show that the invention includes prolonging the hollow part of tube 5 beyond the constriction 10 and locating the matching holes 4 and 9 at the bottom of the device, as opposed to the top thereof, as shown in FIGS. 1-3, everything else being the same.

Figure 5:
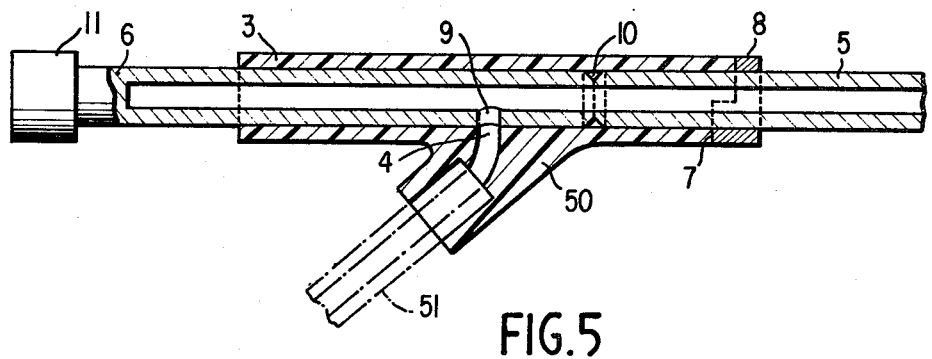
FIG. 5 is a similar view of yet another embodiment of the present invention.
Figure 6:
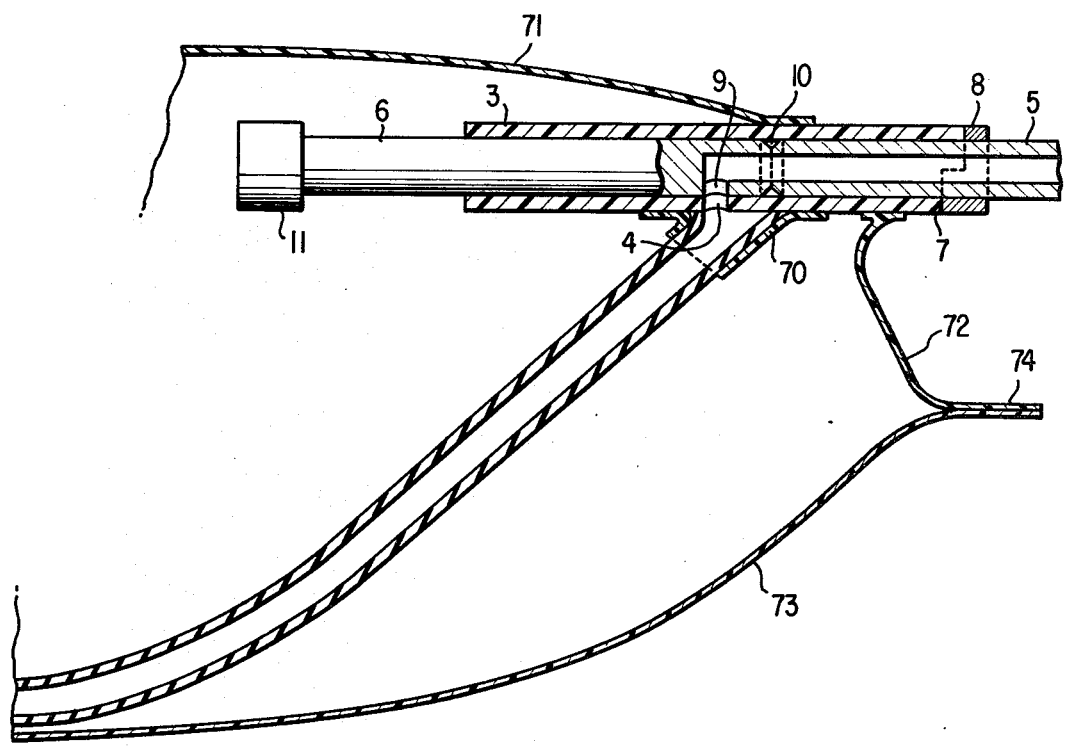
FIG. 6 is still another embodiment of the invention, also shown in longitudinal cross-section.

It is the same for the device of FIG. 5, which shows a special form of sleeve 3 having at the hole 4 a junction 50 permitting attachment of a flexible hose 51. The interest in this arrangement will be explained with reference to FIG. 6. In this case, in contrast to FIG. 1, the device of the invention is a fuel line output at the top of a gas tank 71, being of the non-rigid type, and consisting of two elastomer shells 72 and 73 fused together at their edges 74. The bottom shell 73 is very simple in shape since all the attached devices are situated in the upper shell 72.

It is apparent that, in this configuration, it is necessary to attach to the above described devices a flexible hose 51 to reach fuel at the bottom of the gas tank. To avoid abrasion of the free end of the flexible hose 51, it is attached to a suitable place on the inner surface of the tank. According to FIG. 6, the junction between the flexible hose 51 and the sleeve 3 is a separate piece 70 fastened to the sleeve 3, rather than being molded thereto as in the FIG. 5 embodiment.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A safety device for blocking a fuel line, in particular one leading from an automobile gas tank, comprising:
    an outer elongate sleeve passing through the wall of the gas tank to which it is attached and having a lateral hole therein opening into said gas tank; and,
    a tubular assembly slidable within said sleeve and consisting over part of its length of a solid part, terminated at the end inside the tank by a stop for limiting movement of said assembly in said sleeve in the direction leading out of said tank, and over another part of its length of a tubular part with an opening outside said gas tank on the one end thereof and an opening at a right angle into said lateral hole in said sleeve along the length thereof wherein the parts, solid and tubular, of said tubular assembly are separated by a solid section of smaller diameter forming a peripheral constriction for breaking during a violent collision whereby the lateral hole of said sleeve and the opening at a right angle into the lateral hole are not aligned and fuel cannot escape during said collision.

2. A safety device for blocking a fuel line, in particular one leading from an automobile gas tank, comprising:
    an outer elongate sleeve passing through the wall of the gas tank to which it is attached, having a lateral hole therein opening into said gas tank, and including at an outer end a recess providing an L-shaped configuration in cross-section;
    a tubular assembly slidable within said sleeve and consisting over part of its length of a solid part, terminated at the end inside the tank by a stop for limiting movement of said assembly in said sleeve in the direction leading out of said tank, and over another part of its length of a tubular part with an opening outside said gas tank on the one end thereof and an opening at a right angle into said lateral hole in said sleeve along the length thereof; and,
    a collar supported on said tubular part such that, upon insertion of said tubular part into said sleeve, said opening at a right angle and said lateral hole coincide when said collar is matingly engaged with said recess and wherein said solid part and said collar are separated by a section of said tubular part having a smaller diameter than the remaining portion of said tubular part so as to form a peripheral constriction for breaking during a violent collision whereby the lateral hole of said sleeve and the opening at a right angle into the lateral hole are not aligned and fuel cannot escape during said collision.

3. A safety device as set forth in claim 1, further comprising a flexible tube joined at one end to said outer sleeve for opening therethrough to the right angle opening in said tubular part, the other end of said flexible tube being fastened to the bottom of the gas tank.

4. A safety device as set forth in claim 3, characterized by the fact that it is situated in the upper part of a pliable tank containing all the functional pieces, while the lower part consists of a simple elastomer shell united to the upper part at its periphery.

* * * * *